(No Model.)

E. B. MEYROWITZ.
EYEGLASSES.

No. 368,226. Patented Aug. 16, 1887.

Witnesses
H. A. Lamb.
Joseph Becker.

Inventor
Emil B. Meyrowitz
By his Attorney
Jas. L. Ewin.

UNITED STATES PATENT OFFICE.

EMIL B. MEYROWITZ, OF RIDGEFIELD, NEW JERSEY.

EYEGLASSES.

SPECIFICATION forming part of Letters Patent No. 368,226, dated August 16, 1887.

Application filed November 1, 1886. Serial No. 217,681. (No model.)

*To all whom it may concern:*

Be it known that I, EMIL B. MEYROWITZ, a citizen of the United States, residing at Ridgefield, in the State of New Jersey, and having my place of business at New York city, have invented a new and useful Improvement in Eyeglasses, of which the following is a specification.

This invention relates to the springs and nose-pieces or "clips" of those eyeglasses in which pairs of lenses are connected by bowed springs; and its objects are, first, to provide for balancing the lenses upon the nose parallel to the eyes and at the proper distance therefrom without interference between the spring of the eyeglasses and the brow of the wearer, and without complication of parts or loss of directness in the action of the spring on the nose-pieces; secondly, to provide for attaching the spring at an inclination or slant forward sufficient to prevent contact with the brow and for readily varying the slant to suit different wearers; thirdly, to provide for attaching the spring so that it is adjustable, as aforesaid, without punching or otherwise weakening the spring; fourthly, to provide for attaching the spring and nose-pieces with the former slanting forward and the upper ends of the nose-pieces behind the lenses by one and the same pair of metallic connections, and, fifthly, to provide for readily adjusting the nose-pieces to the noses of different wearers in a peculiar way.

A sheet of drawings accompanies this specification as part thereof.

Figure 1:
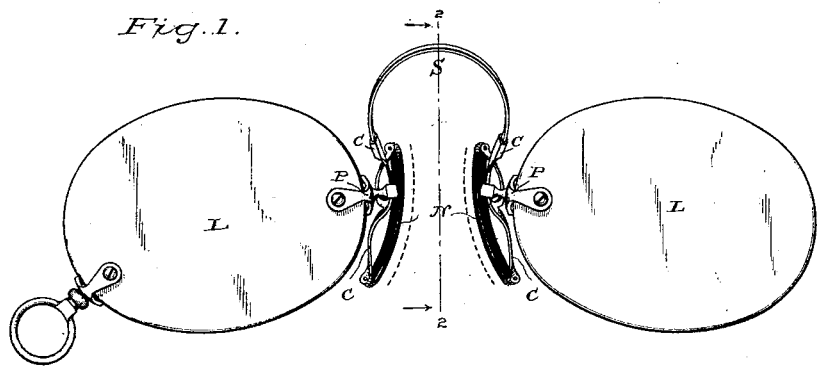
Figure 2:
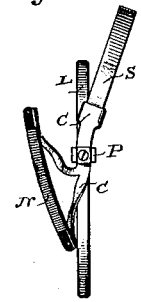
Figure 3:
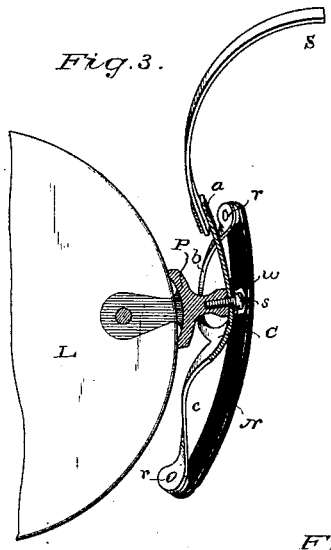
Figure 4:
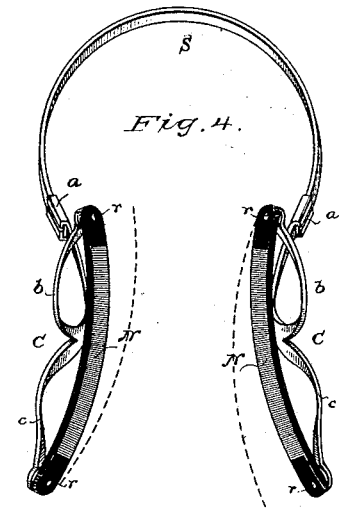
Figure 5:
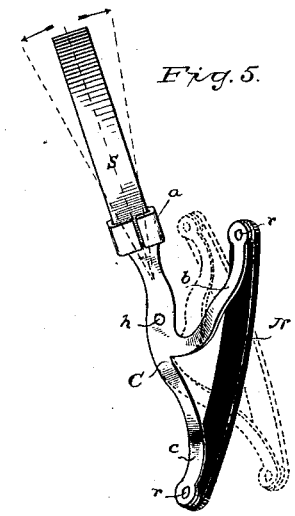
Figure 6:
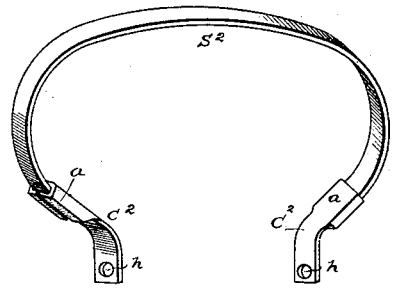
Figure 7:
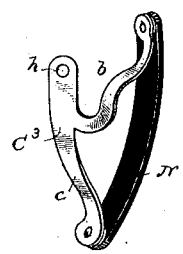

Figure 1 of the drawings is a front view of a pair of eyeglasses illustrating this invention. Fig. 2 represents a section on the line 2 2, Fig. 1. Fig. 3 is a magnified fragmentary front view, partly in section. Fig. 4 is a back view of the clip detached. Fig. 5 is an edge or side view of the same. Fig. 6 is a perspective view of a spring illustrating a modification of the invention, and Fig. 7 is an elevation of a single nose-piece illustrating another modification.

Like letters of reference indicate corresponding parts in the several figures.

With any pair of lenses L L and metallic posts P P, attached directly thereto, as in the example shown, or to their frames in customary manner, and with a bowed spring, S, and nose-pieces N N of any suitable materials and construction, I combine a pair of peculiarly-constructed metallic connections, C C, Figs. 1 to 5, inclusive, preferably of pliable but only moderately soft metal, such as German silver, and of sufficient thickness to render them practically rigid in use. Each of these "connections" C is constructed with a central hole, $h$, Fig. 5, through which passes a screw, $s$, Fig. 3, provided with a steel washer, $w$, to attach the clip tightly between the customary parallel cheeks at the outer ends of the posts P. (See Fig. 2.) Each connection has also a forwardly inclined or slanting upper end, $a$, Figs. 4 and 5, with rebent wings which embrace and fasten its end of the spring S without any necessity for perforating and thus weakening the spring; and, finally, each connection has a bifurcated lower end, comprising a downwardly-projecting arm, $c$, and a rearwardly-projecting arm, $b$, perforated at their outer extremities, to provide for connecting them by pivotal rivets $r$, Fig. 5, with the nose-pieces N or their customary metallic backs.

When all the parts are so united, as represented in Figs. 1, 2, and 3, the spring S slants forward at an angle of about forty-five degrees or less, so as to clear the brow of the wearer of the eyeglasses, and the nose-pieces slant in the reverse direction, so as to extend downward approximately parallel to the front of the nose, thus providing in a very simple manner for balancing the lenses parallel to the eyes and at the proper distance therefrom or proximity thereto without interference with the brow and without complication of parts, as aforesaid.

With the connections C, formed of German silver or like metal, as above described, the slanting upper end, $a$, of each may be bent with the aid of pliers, so as to vary the angle of the spring to suit different wearers, as illustrated by dotted lines in Fig. 5; or they may be bent laterally, so as to render the lenses closer together, (or farther apart,) as illustrated by dotted lines in Fig. 1; and, in like manner, the arms $b$ $c$ may be bent so as to adjust the nose-pieces to noses of different shapes. To facilitate this latter, each of said arms $b$ $c$ is preferably provided with an incipient crook, as represented; and said arms may be so bent in any direction and independently of each other, as to move either end of each nose-piece inward or outward, for example, without disturbing its other end, as illustrated by dotted lines in Fig. 4; or by bending one or both arms the nose-pieces may be rendered more nearly vertical, as shown in dotted lines in Fig. 5.

Fig. 6 represents a "slanting spring," $S^2$, attached by connections $C^2$, minus said arms $b$ $c$, having only said upper ends, $a$, and holes $h$ for use in connection with nose-pieces otherwise attached; and Fig. 7 represents connections $C^3$, having only said independently pliable arms $b$ $c$ and hole $h$ for so attaching nose-pieces N in connection with a spring otherwise attached. Other like modifications will suggest themselves to those skilled in the manufacture of eyeglasses.

I am aware that the bowed springs of such eyeglasses have been attached at right angles to the plane of the lenses, and also in front of the lenses and parallel therewith. Springs so attached form no part of my invention. Neither do I claim, broadly, pliable clips, as I am aware that these are old, broadly considered.

Having thus described my said improvement in eyeglasses, I claim as my invention and desire to patent under this specification—

1. In eyeglasses having a pair of lenses united by a bowed spring and supported wholly upon the nose of the wearer, the combination, with the lenses, of a forwardly-slanting spring and a pair of rearwardly-projecting nose-pieces acted on by said spring, substantially as herein specified, for the objects stated.

2. In eyeglasses having a pair of lenses united by a bowed spring, the combination, with such spring, of a pair of pliable metallic connections rigidly attached to the lenses or lens-frames and having forwardly-slanting upper ends, to and in line with which the ends of the spring are attached, substantially as herein specified, for the object stated.

3. In eyeglasses having a pair of lenses united by a bowed spring, the within-described spring having unpunched ends provided with tightly-attached pliable metallic connections, which are perforated for attachment to the customary lens-posts, and are adapted to be bent between their attaching-points, substantially as herein specified, for the object stated.

4. In eyeglasses having a pair of lenses united by a bowed spring, the combination, with the lenses, spring, nose-pieces, and customary lens-posts, of a pair of pliable metallic connections attached to said posts, having forwardly-slanting upper ends, to which and in line with which the ends of the spring are fixedly attached, and rearwardly and downwardly projecting arms, to which the ends of the nose-pieces are attached by pivotal rivets, substantially as herein specified, for the objects stated.

5. In an eyeglass-clip, metallic connections having bifurcated lower ends with rearwardly and downwardly projecting pliable arms, in combination with suitable nose-pieces supported by the extremities of said arms and adjustable by bending the several arms independently of each other, substantially as herein specified, for the objects stated.

E. B. MEYROWITZ.

Witnesses:
F. BERLIN,
LEE M. EDGAR.